(12) United States Patent
Bui et al.

(10) Patent No.: US 8,079,614 B1
(45) Date of Patent: Dec. 20, 2011

(54) TOWMOTOR SECONDARY LOCK

(75) Inventors: Jimmy Tien Bui, Waterloo (CA); Adam Douglas Brozovic, Kitchener (CA); Todd Jason Hughes, Guelph (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/824,302

(22) Filed: Jun. 28, 2010

(51) Int. Cl.
*B60D 1/02* (2006.01)

(52) U.S. Cl. ........................................ 280/515; 280/477

(58) Field of Classification Search .................. 280/477, 280/515
See application file for complete search history.

(56) References Cited

U.S. PATENT DOCUMENTS

| | | | | |
|---|---|---|---|---|
| 3,007,718 A * | 11/1961 | Backof | ......................... | 280/515 |
| 3,046,037 A * | 7/1962 | Cain | ............................. | 280/477 |
| 3,081,663 A * | 3/1963 | Davis | ............................. | 411/337 |
| 3,797,687 A | 3/1974 | Silva | | |
| 4,002,256 A | 1/1977 | Kroboth | | |
| 4,035,096 A | 7/1977 | Miller | | |
| 4,067,415 A | 1/1978 | Samide | | |
| 4,126,208 A | 11/1978 | McVeen | | |
| 4,579,364 A * | 4/1986 | Kranz | ........................... | 280/507 |
| 5,037,123 A * | 8/1991 | Smith | ........................... | 280/508 |
| 5,083,808 A * | 1/1992 | Torii | ............................. | 280/507 |
| 5,199,733 A * | 4/1993 | DeLorme | ...................... | 280/515 |
| 5,427,399 A * | 6/1995 | Olson | ........................... | 280/515 |
| 5,520,030 A | 5/1996 | Muldoon | | |
| 5,732,967 A | 3/1998 | Behling | | |
| 6,045,147 A | 4/2000 | Schmidt et al. | | |
| 6,179,317 B1 | 1/2001 | Hurst et al. | | |
| 7,004,489 B2 * | 2/2006 | Brown | ........................ | 280/491.3 |
| 7,547,036 B2 * | 6/2009 | Mochizuki et al. | ........... | 280/515 |
| 7,878,526 B1 * | 2/2011 | Jantzen | ........................ | 280/515 |
| 2003/0116940 A1 * | 6/2003 | Takeda | .......................... | 280/515 |
| 2003/0178809 A1 | 9/2003 | Anderson | | |
| 2004/0032111 A1 | 2/2004 | Sanchez | | |
| 2007/0096431 A1 * | 5/2007 | Mochizuki et al. | ........... | 280/515 |
| 2009/0096189 A1 * | 4/2009 | Merten et al. | .................. | 280/515 |
| 2011/0049840 A1 * | 3/2011 | Shaw | ............................. | 280/515 |
| 2011/0121541 A1 * | 5/2011 | Yamano et al. | ................ | 280/515 |

* cited by examiner

*Primary Examiner* — Paul N Dickson
*Assistant Examiner* — Tashiana Adams
(74) *Attorney, Agent, or Firm* — Gifford, Krass, Sprinkle, Anderson & Citkowski, P.C.

(57) ABSTRACT

The present invention provides for a secondary locking assembly for a towmotor when the towmotor is connected to a dolly. The towmotor includes a first lever pivotally connected to a rear panel of the towmotor. The lever is connected to the rear panel of the towmotor by means of a first pivot point. A sleeve having a second extended lever covers a portion of the first lever. The sleeve abuts the first pivot point of the first lever. The sleeve is pivotally connected about a second pivot point located on the first lever. By clamping the first lever and the second lever together, the sleeve moves from the locked position abutting the first pivot point to an unlocked position wherein the first lever as a whole may be pivotally raised to an unlocked position. The locking assembly further includes an elongated rod extending between the first lever and a hitch pin. The elongated rod forces the hitch pin into place and also operates to remove the hitch pin from the locked position when the first lever is moved to the unlocked position.

13 Claims, 4 Drawing Sheets

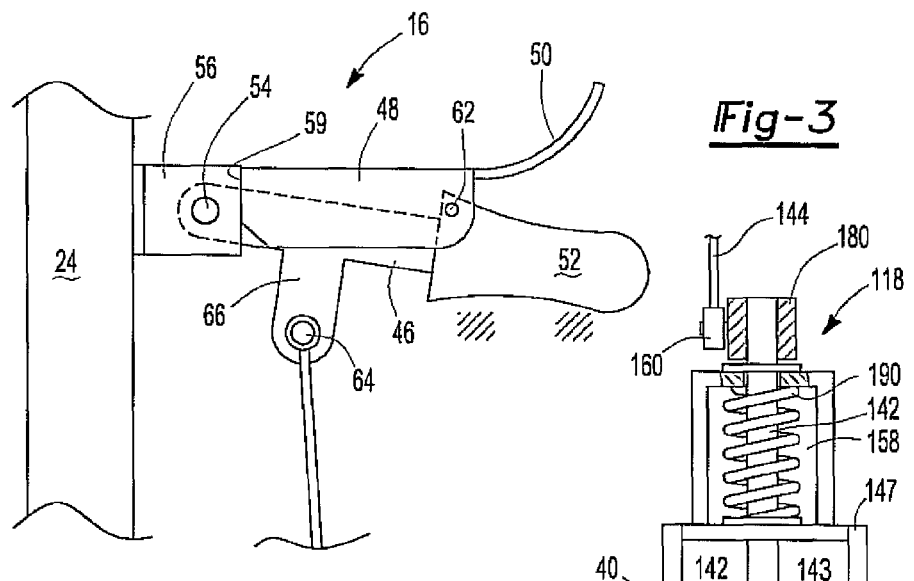
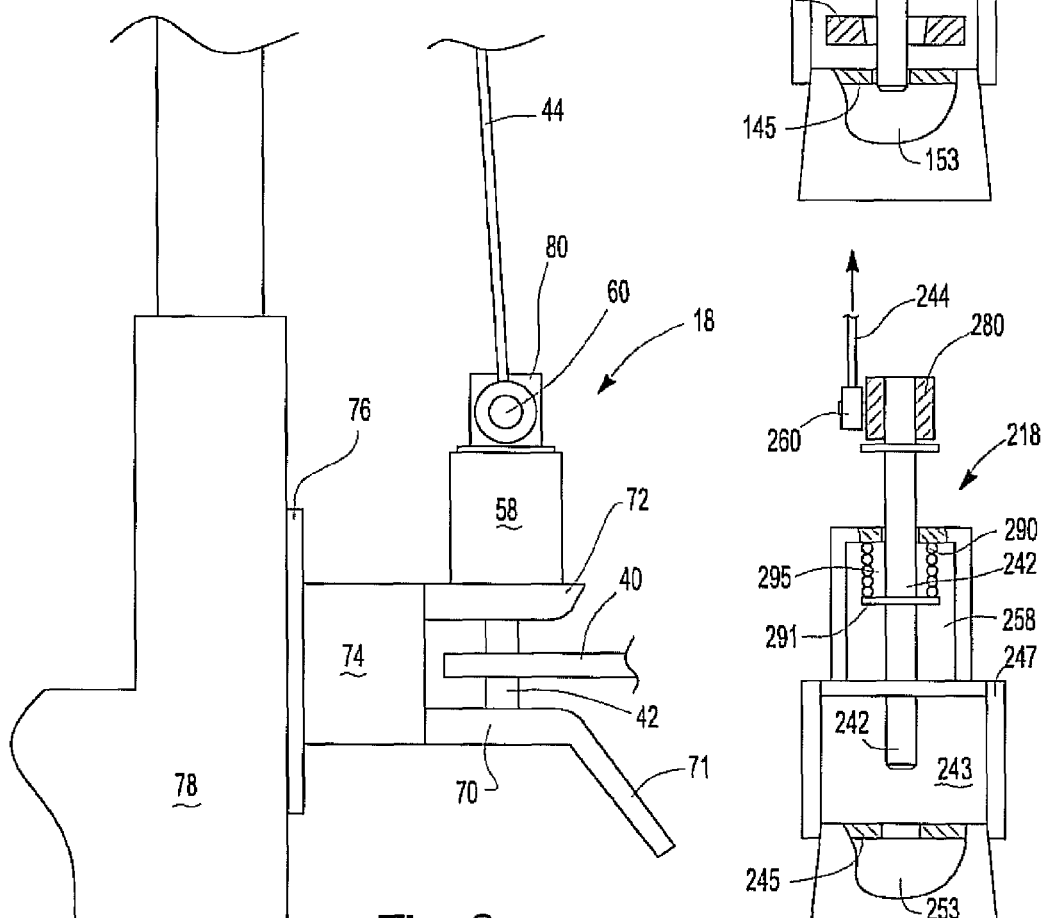

TOWMOTOR SECONDARY LOCK

FIELD OF THE INVENTION

This invention relates generally to towmotors. More particularly, this invention relates to a towmotor secondary lock to further secure the locking mechanism of a towmotor and dolly assembly.

BACKGROUND OF THE INVENTION

A towmotor is a wheeled vehicle having the ability to carry a dolly. The towmotor is capable of carrying loads of up to 10,000 pounds. Towmotors are used in industrial warehouse-like settings to transport large quantities of material. The dolly and the towmotor connect by means of a hitch pin assembly. The towmotor includes a handle and a chain, the chain extending down towards the hitch pin assembly, the chain connecting to the hitch pin. A dolly is a wheeled flatbed trailer-like vehicle. Once the dolly and the towmotor connect, and the spring-actuated pin locks the towmotor to the dolly.

The sole locking means connecting the towmotor to the dolly is the hitch pin assembly. When a towmotor makes a sharp turn, the hitch pin has a tendency to bind with the dolly causing the pin to move up and the hitch pin assembly to unlock. On said sharp turns, the pin may wiggle out and become unlocked. Accordingly, it would be desirable to create a more secure lock to connect a towmotor to a dolly.

Furthermore, it is difficult for a worker to determine whether or not the hitch pin is locked in place. While a towmotor is in operation, the user does not have any visual confirmation that the dolly is securely locked to the towmotor. Accordingly, it would be desirable to provide a locking confirmation means displaying confirmation that the dolly is securely locked to the towmotor.

SUMMARY OF THE INVENTION

The present invention provides for a secondary locking assembly for a towmotor when the towmotor is connected to a dolly. The towmotor includes a first lever pivotally connected to a rear panel of the towmotor. The first lever is connected to the rear panel of the towmotor by means of a first pivot point. A sleeve having a second extended lever covers a portion of the first lever. The sleeve abuts the first pivot point of the first lever. The sleeve is pivotally connected about a second pivot point located on the first lever. By clamping the first lever and the second lever together, the sleeve moves from the locked position abutting the first pivot point to an unlocked position wherein the first lever as a whole may be pivotally raised to an unlocked position. The locking assembly further includes an elongated rod extending between the first lever and the hitch pin. The elongated rod forces the hitch pin into place and also operates to remove the hitch pin from the locked position when the first lever is moved to the unlocked position.

BRIEF DESCRIPTION OF THE DRAWINGS

The above and other features and objects of the invention will be better understood from the following detailed description of the typical embodiments illustrated in the accompanying drawings, in which:

FIG. 2 is a side view of the locking assembly of the towmotor;

FIG. 3 is a side view of one embodiment of the hitch pin assembly;

FIG. 4 is a side view of a second embodiment of the hitch pin assembly;

DETAILED DESCRIPTION OF THE PREFERRED EMBODIMENTS

Figure 1:
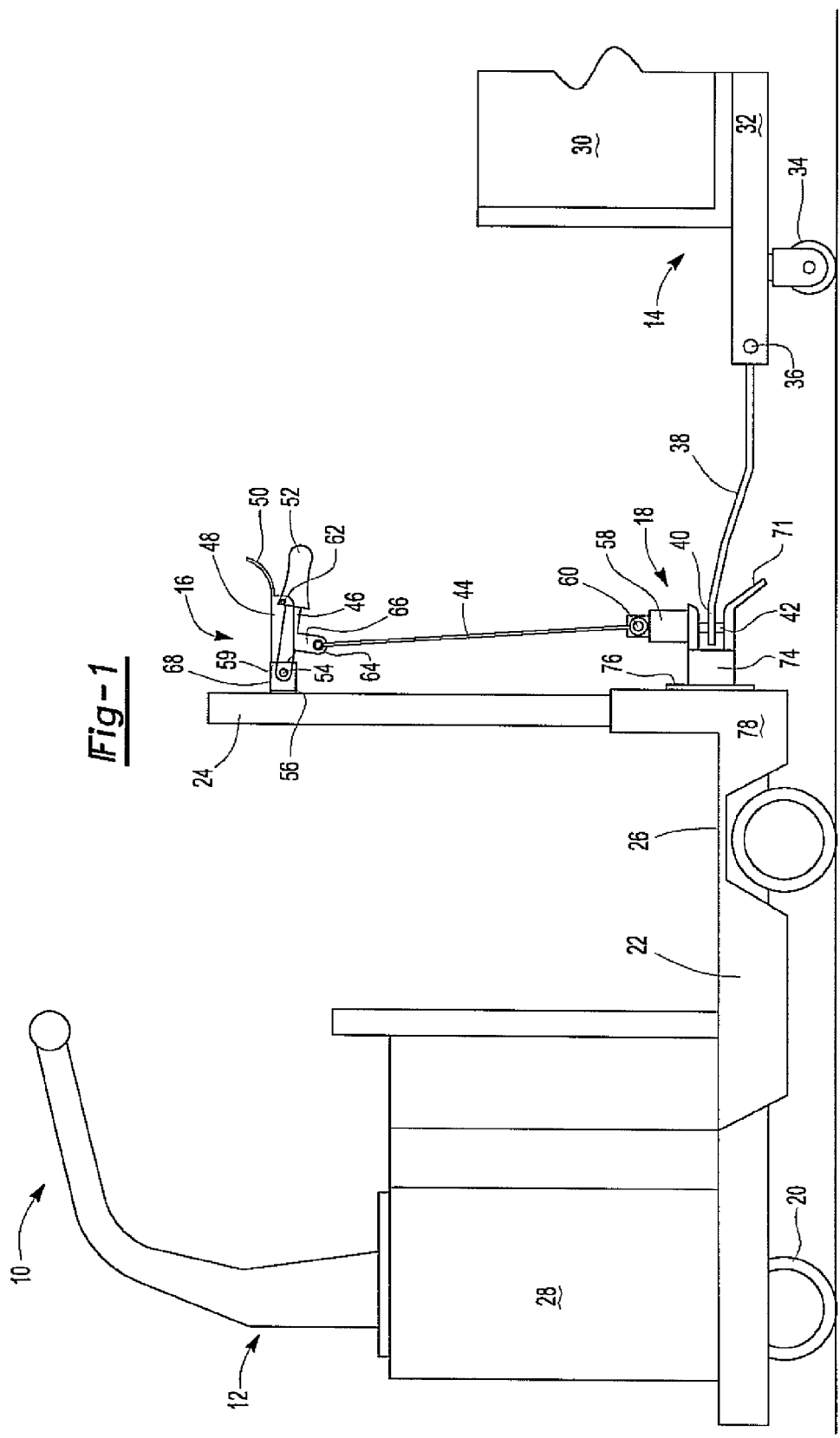
FIG. 1 is a side view of a fully assembled towmotor, locking assembly, and dolly.

The present invention provides for a towmotor assembly wherein a towmotor connects to a dolly by means of a hitch pin assembly to lock the towmotor to the dolly. The invention more particularly provides for an apparatus to secondarily lock the towmotor assembly to the dolly using an elongated member and a sleeve to further enforce the locking mechanism. A sleeve used in connection with a first lever and a handle sufficiently prevents any unwanted disconnection of the dolly from the towmotor. Furthermore, an elongated rod forcibly secures a pin in the locked position to further prevent the unintended disconnection.

The towmotor assembly 10 includes a towmotor 12 and a dolly 14. The towmotor 12 connects to the dolly 14 by means of a hitch pin locking assembly 18. The hitch pin locking assembly 18 broadly includes a pin 42 and a dolly tongue 40. The dolly tongue 40 extends away from the dolly 14 and connects to the pin 42 of the towmotor 12. The dolly tongue 40 includes an aperture sufficient in size to accept the pin 42 of the towmotor 12. The hitch pin locking assembly 18 further includes a pin actuator 58 operable to move the pin 42 of the towmotor 12.

The hitch pin locking assembly 18 includes a base platform 70 to prevent the hitch pin 42 from traveling. The connector 74 connects the hitch pin locking assembly 18 to the rear 78 of the towmotor 12. The hitch pin locking assembly 18 also includes a ramp 71 to facilitate entrance of the dolly tongue 40 to more securedly connect the dolly 14 to the towmotor 12.

FIG. 3 shows one embodiment of a hitch pin locking assembly 118. In this embodiment, the hitch pin locking assembly 118 includes a pin 142 and a dolly tongue 145. The pin actuator 158 includes a spring biasing member 190 to facilitate the insertion of the pin 142 into the aperture 153 of the dolly tongue 145. Furthermore, FIG. 4 shows yet another embodiment of a hitch pin locking assembly 218. The hitch pin locking assembly 218 includes a pin 242 operable to insert into the aperture 253 of the dolly tongue 245. The pin actuator 258 includes actuator 295 having a plurality of ball bearings 290 to facilitate insertion of the pin 242 into aperture 253 of the dolly tongue 245.

Lever assembly 16 of the towmotor 12 includes a first lever 46 having a handle 52. The handle 52 is a gripping portion located on the first lever 46 to assist in locking and unlocking the towmotor. The handle 52 may be positioned at any location on the first lever 46. When handle 52 is raised, the pin 42 is released into an unlocked position. First lever 46 is connected to the pin 42 by means of an elongated rod 44. The elongated rod 44 further secures the pin 42. The elongated rod 44 pushes the pin 42 to stay in place and stay connected to the dolly tongue 40. The elongated rod 44 forces the pin 42 to remain in its locked position. First lever 46 is approximately 75-100 degrees relative to back panel 24 at a locked or first position. Generally, at a closed position, first lever 46 is 90 degrees relative to the back panel 24 at a locked or first position.

The elongated rod 44 connects to the first lever 46 by means of a first protrusion 66 having a pivot point 64 wherein elongated rod 44 is pivotal about the first protrusion 66 connected to the first lever 46. The elongated rod 44 prevents the pin 42 from becoming unlocked during sharp turns of the towmotor 12. Elongated rod 44 further prevents the pin 42 from wiggling out to an unlocked position.

In an alternative embodiment, the elongated rod 44 connects to the first lever 46 by means of a ball joint wherein elongated rod 44 is pivotal about the ball joint connected to the first lever 46. In this embodiment, pivot point 64 is a ball joint. Furthermore in this embodiment, pivot point 60 is a ball joint. The elongated rod 44 prevents the pin 42 from becoming unlocked during sharp turns of the towmotor 12. Elongated rod 44 further prevents the pin 42 from wiggling out to an unlocked position.

In yet another alternative embodiment, the elongated rod 44 connects to the first lever 46 by means of a welded joint wherein elongated rod 44 is fixed to the first lever 46. In this embodiment, pivot point 64 is welded. Furthermore in this embodiment, pivot point 60 is a welded. The elongated rod 44 prevents the pin 42 from becoming unlocked during sharp turns of the towmotor 12. Elongated rod 44 further prevents the pin 42 from wiggling out to an unlocked position.

A sleeve 48 is provided covering the first lever 46. The sleeve 48 is generally U shaped and sufficiently encloses the first lever 46. The first lever 46 connects to a rear panel 24 of the towmotor 12 by means of a connection bracket 56. Connection bracket 56 further includes a pivot point 54 connecting the first lever 46. The first lever 46 is pivotal about the bracket 56 by means of a pivot point 54. The bracket 56 further includes a side surface 68. The sleeve 48, in a locked position, abuts the bracket 56.

Figure 5:
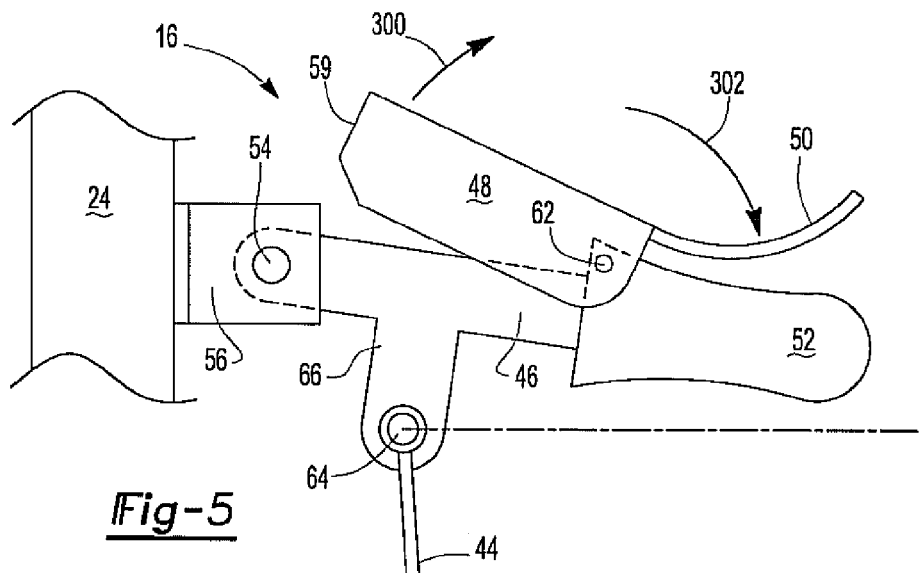
FIG. 5 is a side view of the first lever and sleeve having a second lever in an unlocked position.
Figure 6:
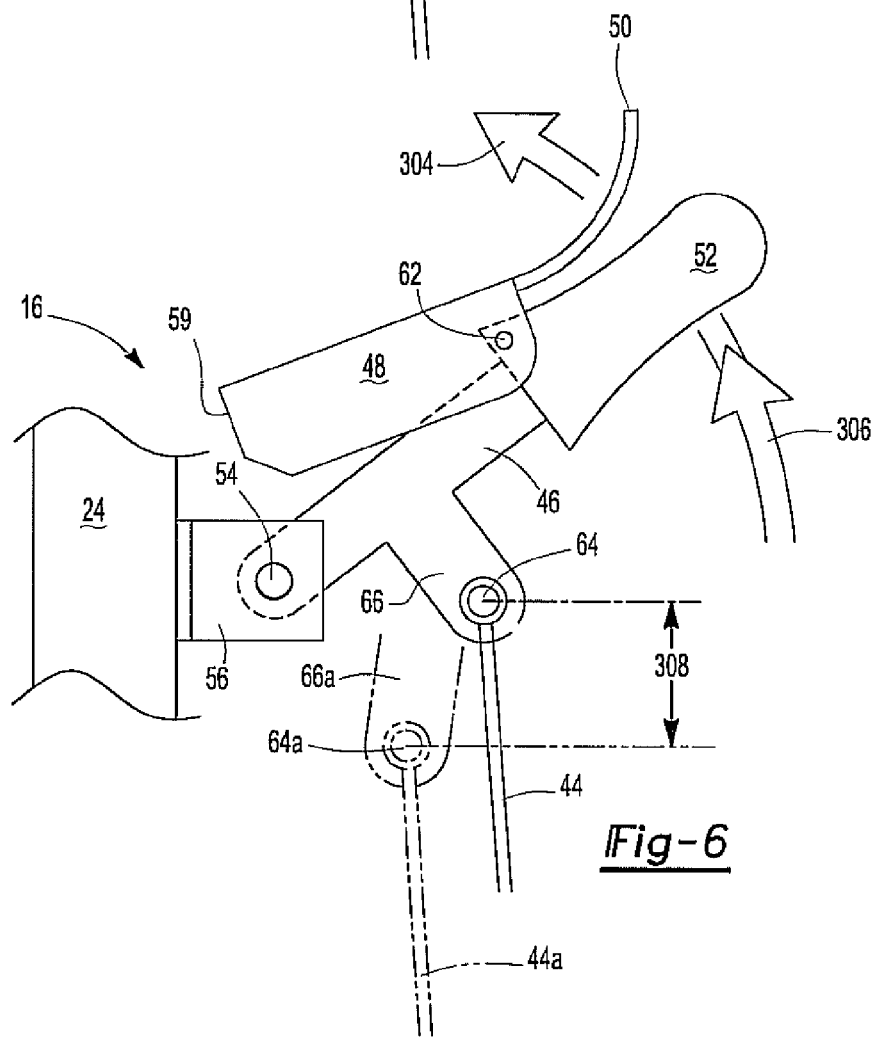
FIG. 6 is a side view of an unlocked hitch pin wherein the first lever is elevated to the unlocked position.
Figure 7:
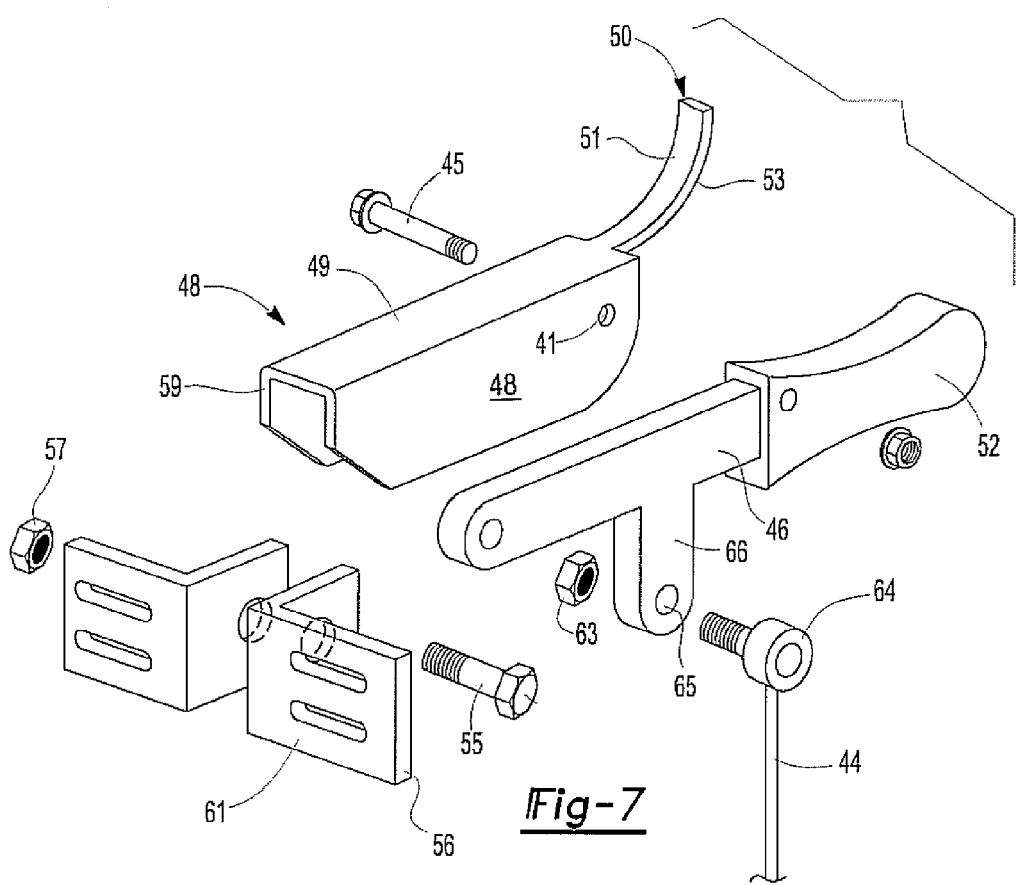
FIG. 7 is an exploded perspective view of the first lever, second lever, and sleeve connecting to the extended rod.

The sleeve 48 further includes an end portion 59. The end portion 59 directly abuts the connection bracket 56 in the locked position. The abutment of the end portion 59 of the sleeve member 48 to the connection bracket 56 prevents a user from lifting the first lever 46 by means of the handle 52 to an unlocked position. The sleeve 48 is pivotally connected to the first lever 46 and the handle 52 of the first lever 46 by means of pivot point 62. The sleeve 48 further includes a second lever 50. As shown by FIG. 5, when second lever 50 moves toward the handle 52 of the first lever 46 (as shown by movement arrow 302), the abutment between the end portion 59 of the sleeve 48 and the connection bracket 56 ceases to exist, allowing for a user to raise the handle 52 thereby releasing the pin 42. Movement arrows 300 and 302 show a user pinching the second lever 50 towards the handle 52 of the first lever 56 to raise the sleeve 48 to stop the abutment of the end portion 59 to the connection bracket 56. Once the second lever 50 and the handle 52 are sufficiently pinched together, the handle 52 and the first lever 46 may be raised as shown by movement arrow 306 as seen in FIG. 6. The raising of the first lever 46 and the handle 52 thereby raises the elongated rod 44 thereby unlocking the pin 42 from the dolly tongue 40. Once the pin 42 is removed from the dolly tongue 40, the dolly 14 may be disconnected from the towmotor 12.

The sleeve 48 is made of a metal or plastic material, such as aluminum, having high strength and resilience qualities. The elongated rod 44 and the first lever 56 are made of a material, such as a metal, having high strength and resilience qualities. The elongated rod 44 must have high strength qualities capable of resisting bending of the elongated rod 44 to sufficiently force the hitch pin 42 in a locked position. The sleeve 48 and the second lever 50 is a once piece constriction. The handle 52 is made of a highly resilient material, such as a plastic, capable of feeling comfortable to the user.

In an alternative embodiment, first lever 46 and handle 52 is a once piece construction. The first lever 46 and handle 52 in a one piece construction may be made of metal, such as aluminum or steel, or a polymeric plastic or rubber, among other materials.

The sleeve 48 having the second lever 50 used in connection with the first lever 46 and the handle 52 sufficiently prevents any unwanted disconnection of the dolly tongue 40 of the dolly 14 from the towmotor 12. The abutment of the end portion 59 of the sleeve 48 to the connection bracket 56 prevents unlocking of the pin 42 unless a user manually lifts the end portion 59 of the sleeve 48 to cease the abutment to the connection bracket 56. Furthermore, the elongated rod 44 forcibly secures the pin 42 in the locked position. The combination of the sleeve 48 having the second lever 50 and the elongated rod 44 provides for a highly secure locking mechanism for a towmotor 12.

It is also to be understood that, although the foregoing description and drawings describe and illustrate in detail working embodiments of the present invention, to those skilled in the art to which the present invention relates, the present disclosure will suggest many modifications and embodiments. The present invention, therefore, is intended to be limited only by the scope of the appended claims and the applicable prior art.

We claim:

1. A locking assembly for securing a hitch pin of a towmotor to a tongue of a dolly, the locking assembly comprising:
    a first lever pivotally connected to a rear panel of the towmotor, the first lever connected to the rear panel by means of a first pivot point;
    a sleeve covering a portion of the first lever, the sleeve abutting the first pivot point defining a locked position, the sleeve pivotally connected about a second pivot point, the sleeve further including an extended second lever operable to pivot the sleeve about the second pivot point thereby moving the sleeve to a position not abutting the first pivot point defining an open position; and
    an elongated rod extending between the first lever and the hitch pin, the elongated rod operable to lift the hitch pin from a first position to a second position, the elongated rod operable to force the hitch pin in a first position;
    wherein the elongated rod forcibly holds the hitch pin in a first position until the first lever is manually lifted to a second position, the elongated rod forcing the hitch pin in a first position thereby preventing unintended unlocking.

2. The locking assembly of claim 1, wherein the first lever is connected to the elongated rod.

3. The locking assembly of claim 2, wherein the elongated rod is securely affixed to the first lever.

4. The locking assembly of claim 2, wherein the elongated rod is pivotally attached to the first lever.

5. The locking assembly of claim 1, wherein the elongated rod is connected to the hitch pin.

6. The locking assembly of claim 5, wherein the elongated rod is securely affixed to the hitch pin.

7. The locking assembly of claim 1, wherein the locking assembly is in a locked position when the first lever extends perpendicularly from the rear panel.

8. The locking assembly of claim 1, wherein a locked position requires the first lever lifted to a position relatively parallel to the planar back panel of the towmotor.

9. The locking assembly of claim 1, wherein the first position is defined as the locked position.

10. The locking assembly of claim 1, wherein the second position is defined as the unlocked position.

11. The locking assembly of claim 1, wherein the sleeve and the second lever combination is a one-piece construction.

12. The locking assembly of claim 1, wherein the first lever further includes a gripping portion.

13. The locking assembly of claim 12, wherein the gripping portion of the first lever is a handle.

* * * * *